J. A. ADAMS.
COMBINED AUTOMATIC AND STRAIGHT AIR VALVE MECHANISM.
APPLICATION FILED JUNE 9, 1915.
1,215,895.
Patented Feb. 13, 1917.
2 SHEETS—SHEET 1.
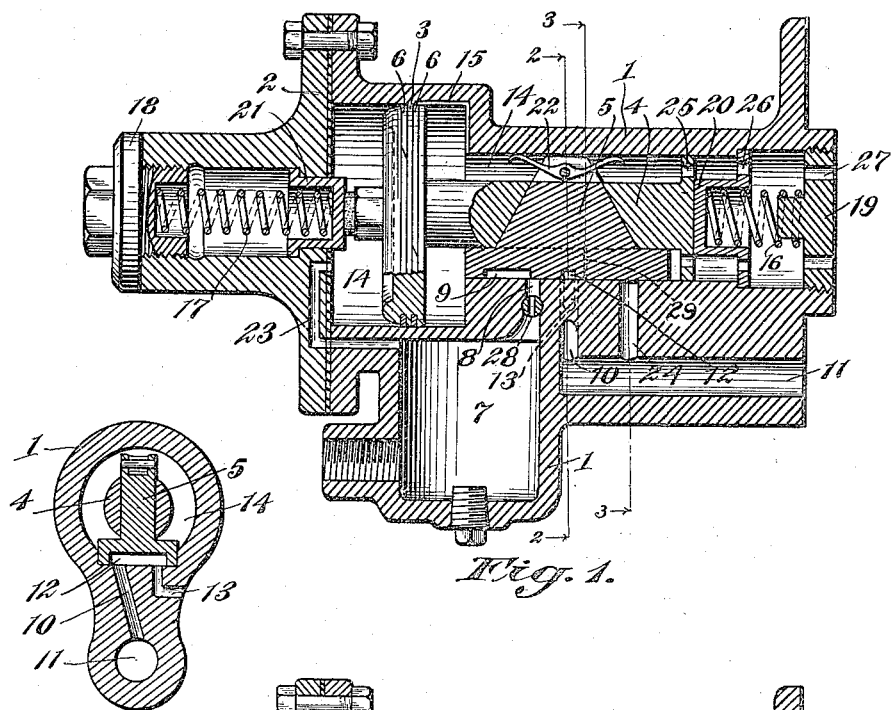
Fig. 1.
Fig. 5.
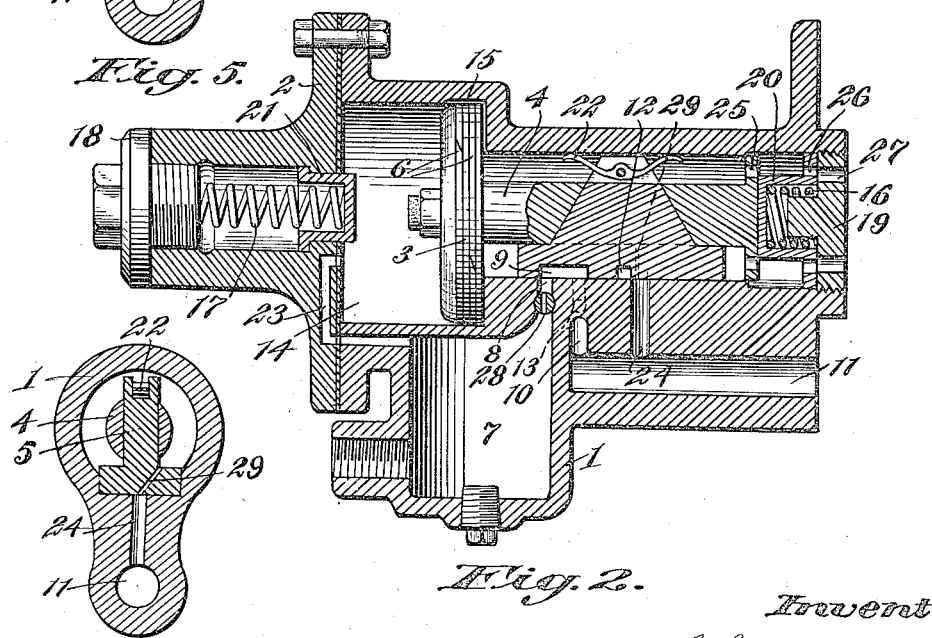
Fig. 2.
Fig. 6.
Inventor:
John A. Adams.

J. A. ADAMS.
COMBINED AUTOMATIC AND STRAIGHT AIR VALVE MECHANISM.
APPLICATION FILED JUNE 9, 1915.

1,215,895.

Patented Feb. 13, 1917.
2 SHEETS—SHEET 2.

Inventor:
John A. Adams

UNITED STATES PATENT OFFICE.

JOHN A. ADAMS, OF NOGALES, ARIZONA, ASSIGNOR TO ADAMS AIR BRAKE COMPANY, A CORPORATION OF NEW MEXICO.

COMBINED AUTOMATIC AND STRAIGHT-AIR VALVE MECHANISM.

1,215,895.            Specification of Letters Patent.     Patented Feb. 13, 1917.

Application filed June 9, 1915. Serial No. 33,178.

*To all whom it may concern:*

Be it known that I, JOHN A. ADAMS, a citizen of the United States, residing at Nogales, in the county of Santa Cruz and State of Arizona, have invented new and useful Improvements in Combined Automatic and Straight-Air Valve Mechanisms, of which the following is a specification.

This invention relates in general to fluid pressure brakes, such as are usually operated by compressed air and more especially to a combined automatic and straight air brake controlling valve, designed for use on locomotives and cars, and adapted to be operated either automatically by reduction in the train brake pipe pressure and using the auxiliary reservoir reserve air in the usual way, or by increasing the normal train brake pipe pressure and using straight air from the main reservoir on the locomotive direct to the brake cylinder, and it consists in the combinations, constructions and arrangements herein described and claimed.

One of the objects of my invention is to provide an improved combined automatic and straight air valve mechanism for setting the brakes, either by reducing or increasing the normal train brake pipe pressure through the engineer's brake valve.

Another object of my invention is to provide an improved apparatus of the type described, whereby the brakes may be applied and released or controlled at will, either by the use of automatic or straight air, regardless of the weight or tonnage of a car or the different train brake pipe pressures.

Other objects and advantages will appear in the following specification and the novel features of the device will be particularly pointed out in the appended claim.

My invention is illustrated in the accompanying drawings forming part of this application in which—

Figure 1 is a view showing the central vertical section through the device in release position.

Fig. 2 is a similar view of the same with valve in position for a straight air application.

Fig. 5 is a cross section view along the line 2—2 of Fig. 1.

Fig. 6 is a cross section view along the line 3—3 of Fig. 1.

Figure 3:
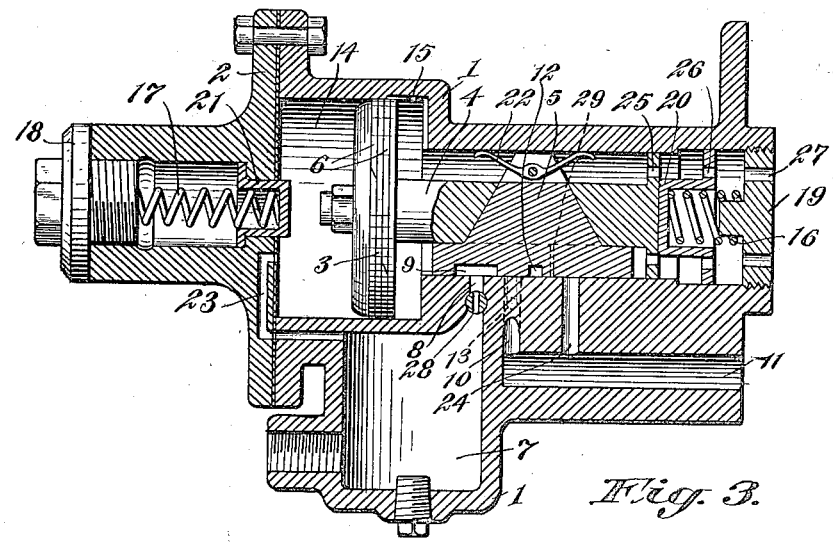
Fig. 3 is a similar view showing the valve in lap position.
Figure 4:
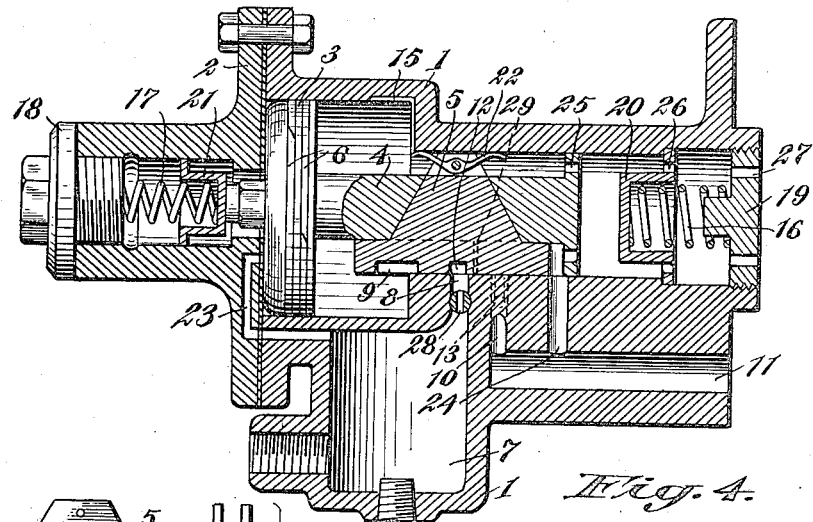
Fig. 4 is a similar view of the same showing the valve in automatic emergency position.
Figure 7:
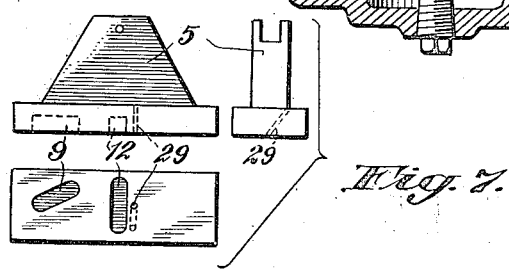
Fig. 7 is a plan view of the slide valve showing end and side elevations.

The present invention is an improvement in combined automatic and straight air valve mechanisms such as shown and described in my prior application for Letters Patent of the United States, Serial No. 12,758, filed by me on March 8, 1915.

In the following specification I will describe completely the novel combined automatic and straight air valve mechanism and the operation thereof, and only so much of the ordinary air brake mechanism which coöperates therewith as will be sufficient for a clear understanding of the use and operation of my invention.

In carrying out my invention I provide a valve casing 1 of suitable shape. In the present instance I have shown this as a cylinder provided with a cap 2 which may be secured to the body portion in any suitable manner.

Within the interior of the valve casing is a piston valve 3 designed to operate the piston valve rod 4 which controls the slide valve 5. Packing rings 6 are provided for the piston valve. The slide valve 5 is designed to control the air pressure flowing from the train brake pipe to the brake cylinder through cavity 7, port 8, passage 9 in the slide valve and into port 10 leading to passage 11 when an increase over the normal train brake pipe pressure is made through the engineer's valve, which moves the piston valve 3 from its normal position and forces the slide valve 5 to uncover the port 10 leading into passage 11 and direct to the brake cylinder for a straight air application of the brakes. At 13 is shown an exhaust port normally open but adapted to be closed by either an increase or reduction of air pressure in the train brake pipe. A feed groove 15 in the piston cylinder casing around piston 3 is provided to keep the auxiliary reservoir charged. At 29 is shown a port which allows the excess air pressure entering the auxiliary reservoir through feed groove 15, when a straight air application is made by increasing the train brake pipe pressure, to pass to the brake cylinder, thereby preventing any overcharge of air pressure in the auxiliary reservoir which may be caused by increasing the train brake pipe pressure for a straight air application of the brakes.

At 16 and 17 are shown two springs, which are provided for the purpose of moving the piston valve 3 to its normal position, when the train brake pipe and auxiliary reservoir air pressures have equalized. Backing plugs 18 and 19 are provided to hold the springs in position. At 20 and 21 are shown two bushings, which are provided for the purpose of limiting the movement of the springs 16 and 17. At 22 is shown a slide valve spring which keeps the slide valve properly seated. Passage 23 is provided for the purpose of allowing the air coming from the train brake pipe through cavity 7 to pass into the piston valve cylinder cavity 14. At 24 is shown a port connecting the auxiliary reservoir air pressure with passage 11 leading to the brake cylinder, when a reduction in the train brake pipe pressure is made for an automatic application of the brakes and it is also used to vent off any excess air pressure from the auxiliary reservoir through port 29 when a straight air application of the brakes is made. It will thus be seen that any increase in the train brake pipe pressure above normal, will move the piston valve 3 and the slide valve 5 will cover the exhaust port 13 and uncover the port 10, admitting the straight air direct to the brake cylinder from the train brake pipe through cavity 7 port 8 passage 9 in the slide valve into port 10 and passage 11.

From the foregoing description of the various parts of the device, the operation thereof may be readily understood.

To make an automatic service or emergency brake application with my combined automatic and straight air valve, the engineer makes a reduction in the normal train brake pipe air pressure in the usual way through the engineer's valve; this permits the release of the air from the train line side of the piston valve through passage 23 and cavity 7; the auxiliary reservoir air pressure then forces the piston valve 3 to move in the direction of spring 17; the slide valve 5 then covers the exhaust port 13 and uncovers port 24; the auxiliary reservoir air pressure then flows through passage 11 direct to the brake cylinder which makes an automatic application of the brakes, the force of the application being governed by the amount of reduction of air pressure made through the engineer's brake valve.

To release the automatic application of the brakes, the engineer re-charges the train brake pipe, which forces the piston to uncover the feed groove 15 and allows the air to pass through the passages 25, 26 and 27 to the auxiliary reservoir. When the air pressure is again equalized on both sides of the piston valve 3 the spring 16 forces it to its normal position and the slide valve passage 12 uncovers the port 10 and the exhaust port 13 releasing the air from the brake cylinder to the atmosphere, thus releasing the brakes.

To make a straight air service or emergency brake application with my combined automatic and straight air valve, the engineer increases the normal train brake pipe pressure, cavity 7 being connected directly to the train brake pipe, air passes from the train brake pipe through cavity 7 and passage 23 into the piston valve chamber 14, where it forces the piston valve 3 to move the slide valve 5 covering the exhaust port 13 and uncovering the port 10 which permits the straight air to flow through passage 9 in the slide valve and on through passage 11 direct to the brake cylinder, thereby setting or applying the brakes.

The amount of increased air pressure added to the normal train brake pipe pressure as above described, to set the brake with my improved automatic and straight air valve, also keeps the auxiliary reservoir charged through the feed groove 15. The port 29 is arranged in the slide valve 5 to vent the excess air pressure accumulated in the auxiliary reservoir when making a straight air brake application and is covered when the air pressure equalizes on both sides of the piston valve 3, the spring 16 moving the valve to its normal position covers the port 8 and uncovers the exhaust port 13 in the valve casing, which permits the release of the air from the brake cylinder to the atmosphere through passage 11, port 10, passage 12 in the slide valve and exhaust port 13 when the train brake pipe pressure is reduced to normal through the engineer's valve, thus releasing the brakes.

It will thus be seen that it depends entirely on the amount of increased air pressure which the engineer adds to the normal train brake pipe pressure how hard the brakes are applied, as he has complete control and can make either an automatic or straight air application of the brakes at will, by the use of the engineer's brake valve on the engine. By the use of my valve it is impossible to lose the braking power, since any position, other than running or lap positions of the engineer's brake valve will apply the brakes.

By the use of my valve, the brakes can be applied by both the use of straight air and automatic air. Straight air can be applied to the brakes and automatic air can be applied on top, or automatic air can be applied to the brakes and straight air can be applied on top, but with my valve it is better to use straight air in all cases, thereby having the automatic air in reserve in case of accident, such as the parting of a hose connection or the braking of a train brake pipe. As is clearly seen, the auxiliary reservoir is kept charged by the use of my valve.

By the use of my valve using straight air, the pressure in each brake cylinder will be the same, whether the cylinder piston is set to travel five inches or ten inches, for the reason that the increased air pressure applied to the normal train brake pipe pressure at the engine, is equally distributed through my valve to the brake cylinders. This prevents to a large extent, the parting or breaking in two of the train, as is now very often the case with the present system of automatic air brakes. My valve will act perfectly, regardless of the weight or tonnage of a car or the different train brake pipe pressures, and permits of a gradual control by using either automatic or straight air for a brake application.

In making a straight air service brake application with my valve, the engineer governs the force of the application by the manipulation of the engineer's brake valve, by increasing the normal train brake pipe pressure and can retain the amount of air pressure applied to the brake cylinder by making a sufficient reduction in the increased train brake pipe pressure to move the valve to lap position as shown in Fig. 3, and in case the engineer has made a too severe application of the brakes, he can moderate the overcharge to any pressure he desires without going into full release and so graduate the same at will, until the normal train brake pipe pressure is reached, when the brakes will release.

In making an automatic service brake application with my valve, the engineer governs the force of the application by the manipulation of the engineer's brake valve, by reducing the normal train brake pipe pressure and can retain the amount of air pressure applied to the brake cylinder, by making a slight increase in the train brake pipe pressure sufficient to move the slide valve 5 to cover the port 24 leading into passage 11 to the brake cylinder, should he find that he has not made a sufficient reduction to control the train, he can make a further reduction to increase the force of the brake application from the auxiliary reservoir reserve air and should he find that he had exhausted the auxiliary reservoir reserve air pressure, he could then move the engineer's valve into full release making a straight air application to the brakes and re-charge the auxiliaries at the same time.

Should it be desired to operate the valve by the use of automatic air only, the cut out cock 28 is provided to close the port 8 leading from the cavity 7 to the passage 9 in the slide valve 5 and the valve would then perform all the functions of the present system of automatic brake applications by reductions of the normal train brake pipe pressure made through the engineer's or conductor's valves in the usual manner.

Having now described my invention, what I claim as new and desire to secure by Letters Patent is:—

In an air brake system, a combined automatic and straight air valve mechanism for controlling the brakes, comprising a casing provided with a main piston valve chamber, a piston valve disposed in said chamber, packing rings for said piston valve, a feed groove in the wall of the casing around said piston valve when the latter is moved from its normal position by an increase in the normal train brake pipe pressure, a piston rod extending through said piston valve, a passage for establishing communication between said main piston valve chamber and the auxiliary reservoir, a cavity in the lower part of said valve casing connecting with the train brake pipe to receive a supply of compressed air, a passage in the wall of the casing and cylinder cap connecting said cavity with the main piston valve chamber, an exhaust port in the valve casing and means for controlling said exhaust port and establishing communication between the train brake pipe and the brake cylinder for a straight air application of the brakes, said means comprising a slide valve operated by the movement of said piston valve, by increasing or reducing the train brake pipe normal air pressure by the manipulation of the engineer's brake valve, a passage in said slide valve, a port leading from the cavity connecting with the train brake pipe to said slide valve passage, a passage connecting with the brake cylinder, an exhaust passage in the slide valve normally uncovering the exhaust port and adapted to cover the exhaust port when an increase or reduction is made in the train brake pipe pressure, a port connecting said exhaust passage with the passage leading to the brake cylinder, said port being normally open to the exhaust port and adapted to be covered when the slide valve is moved to lap position and is uncovered by the passage in the slide valve connecting with the port leading from the train brake pipe cavity, when the train brake pipe pressure is increased, for a straight air application of the brakes, a port connecting the passage leading to the brake cylinder and auxiliary reservoir air pressure in the piston valve cylinder cavity, said port being normallly covered by the slide valve and adapted to be uncovered when a reduction is made in the train brake pipe for an automatic application of the brakes, springs for moving the piston valve to its normal position when the air pressure is equalized on both sides, a port through slide valve to vent auxiliary reservoir excess air pressure to the brake cylinder when a straight air application of the brakes is made, a cap for closing the main piston valve chamber, bushings for limiting the movement of springs and hold the piston valve in its normal position, a plug for closing the spring cavity in the cylinder cap and a backing plug to hold spring in position with a passage for air to the auxiliary reservoir.

In testimony whereof I affix my signature in the presence of two witnesses.

JOHN A. ADAMS.

Witnesses:
   JAS. W. NORMENT,
   W. E. POMEROY.

Copies of this patent may be obtained for five cents each, by addressing the "Commissioner of Patents, Washington, D. C."